United States Patent [19]

Griffin

[11] 4,288,131
[45] Sep. 8, 1981

[54] CABINET-MOUNTED BATHROOM-SCALE

[76] Inventor: William J. Griffin, 2531 Rosewood Ave., Roslyn, Pa. 19001

[21] Appl. No.: 34,124

[22] Filed: Apr. 27, 1979

[51] Int. Cl.³ .......................... G01G 19/52; A47F 5/08
[52] U.S. Cl. .................................... 312/245; 312/313; 312/317 R; 177/126; 177/142; 5/147; 5/158
[58] Field of Search ............... 312/245, 233, 248, 313, 312/314, 317; 108/49; 177/126, 142, 144; 5/146, 147, 158

[56] References Cited

U.S. PATENT DOCUMENTS

| | | | |
|---|---|---|---|
| 371,871 | 10/1887 | Ayres | 5/147 |
| 456,915 | 7/1891 | Stevens | 5/147 |
| 456,965 | 8/1891 | Sanor | 5/147 |
| 460,574 | 10/1891 | Gill | 5/147 |
| 1,887,986 | 11/1932 | Baldwin | 177/126 |
| 2,181,272 | 11/1939 | Greenleaf | 177/126 |
| 2,284,811 | 6/1942 | Ferrelle | 312/313 |
| 2,484,377 | 10/1949 | Eramo et al. | 5/158 |
| 2,872,178 | 2/1959 | Holland | 177/126 |
| 2,924,443 | 2/1960 | Townsend et al. | 177/126 |
| 3,097,712 | 7/1963 | Johnson | 177/126 |

Primary Examiner—Victor N. Sakran
Attorney, Agent, or Firm—O'Brien and Marks

[57] ABSTRACT

A retractable cabinet-mounted bathroom-scale including a cabinet or housing mounted to or recessed into a wall and a conventional spring-type bathroom-scale having its rear end pivotally mounted to the housing, with its pivots extending into elongated vertical pivot-guiding recesses in the side-walls of the housing, in which the pivots can move up and down, and the bathroom scale being so arranged in relation to the housing that when it is retracted it is vertically disposed and its operative top-side faces outwardly and its front end is in the bottom of the housing and its rear end in the top of the housing, and when the bathroom-scale is swung outwardly into its horizontal operative position its front end is spaced outwardly from the housing and is supported on the floor on a pair of gliders mounted to or rollers on pivots mounted to the front end thereof and its rear end is pivotally mounted in the housing with its rear pivots in the bottoms of the pivot-guiding recesses.

6 Claims, 6 Drawing Figures

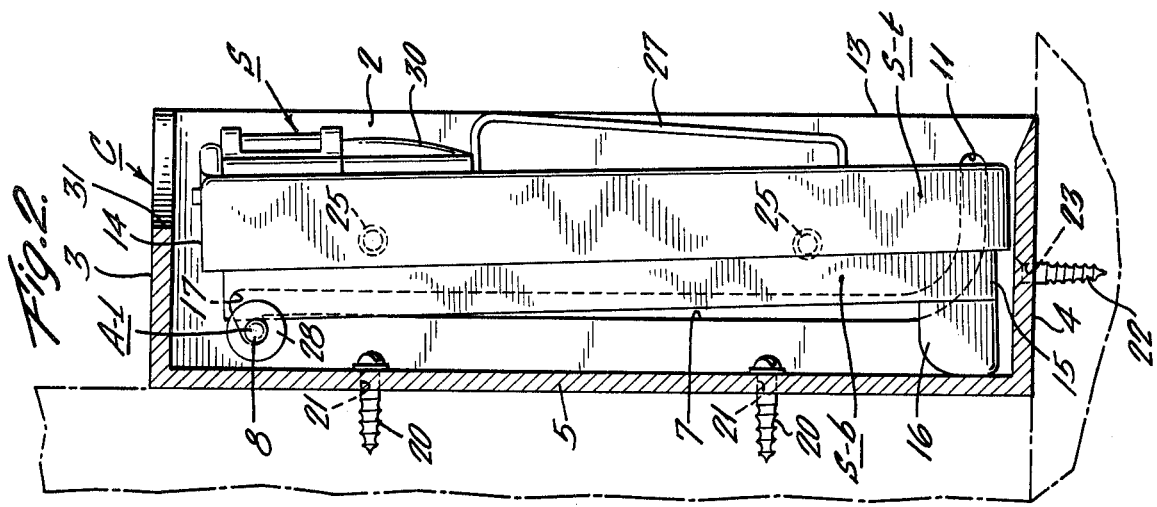
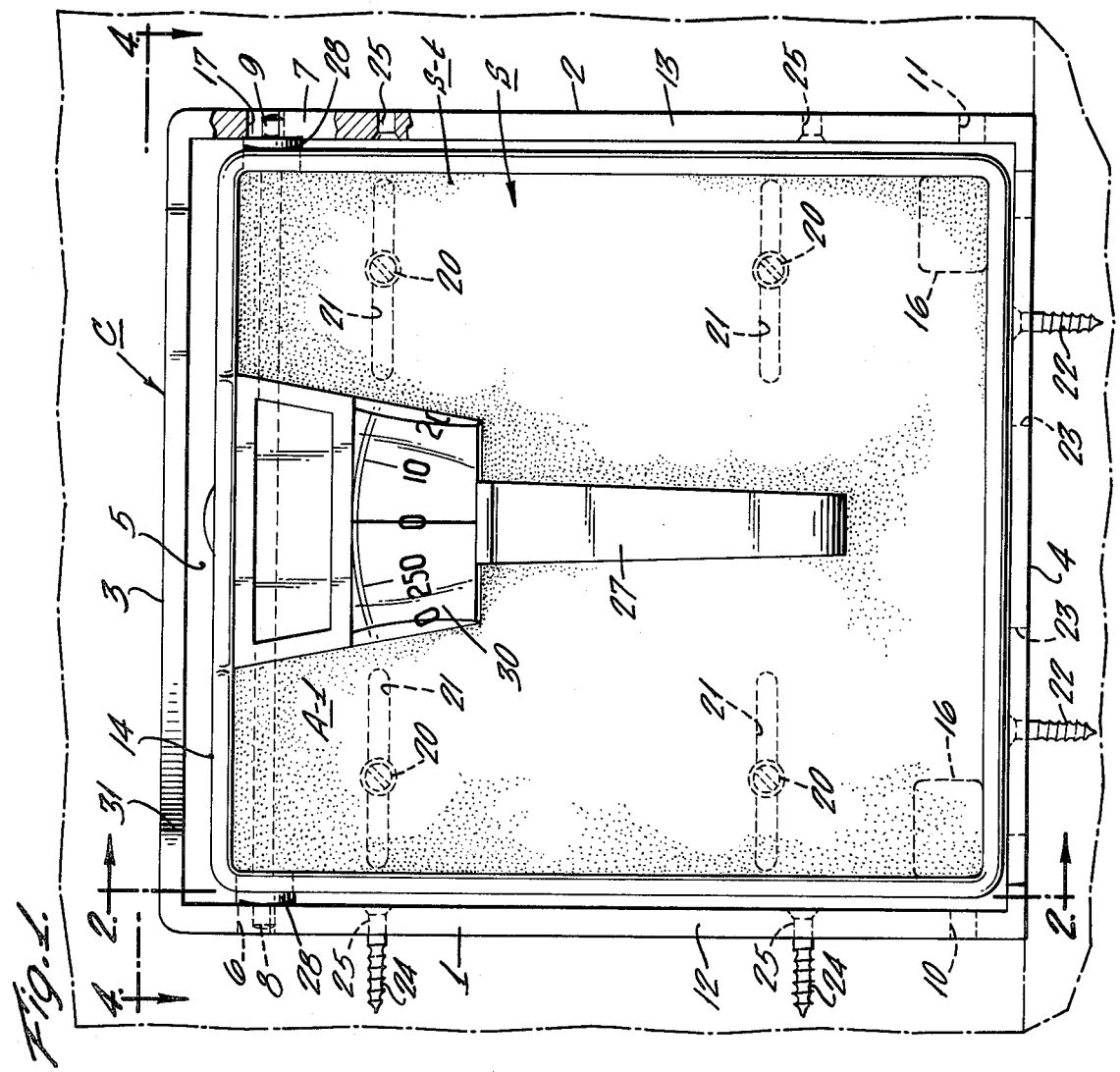

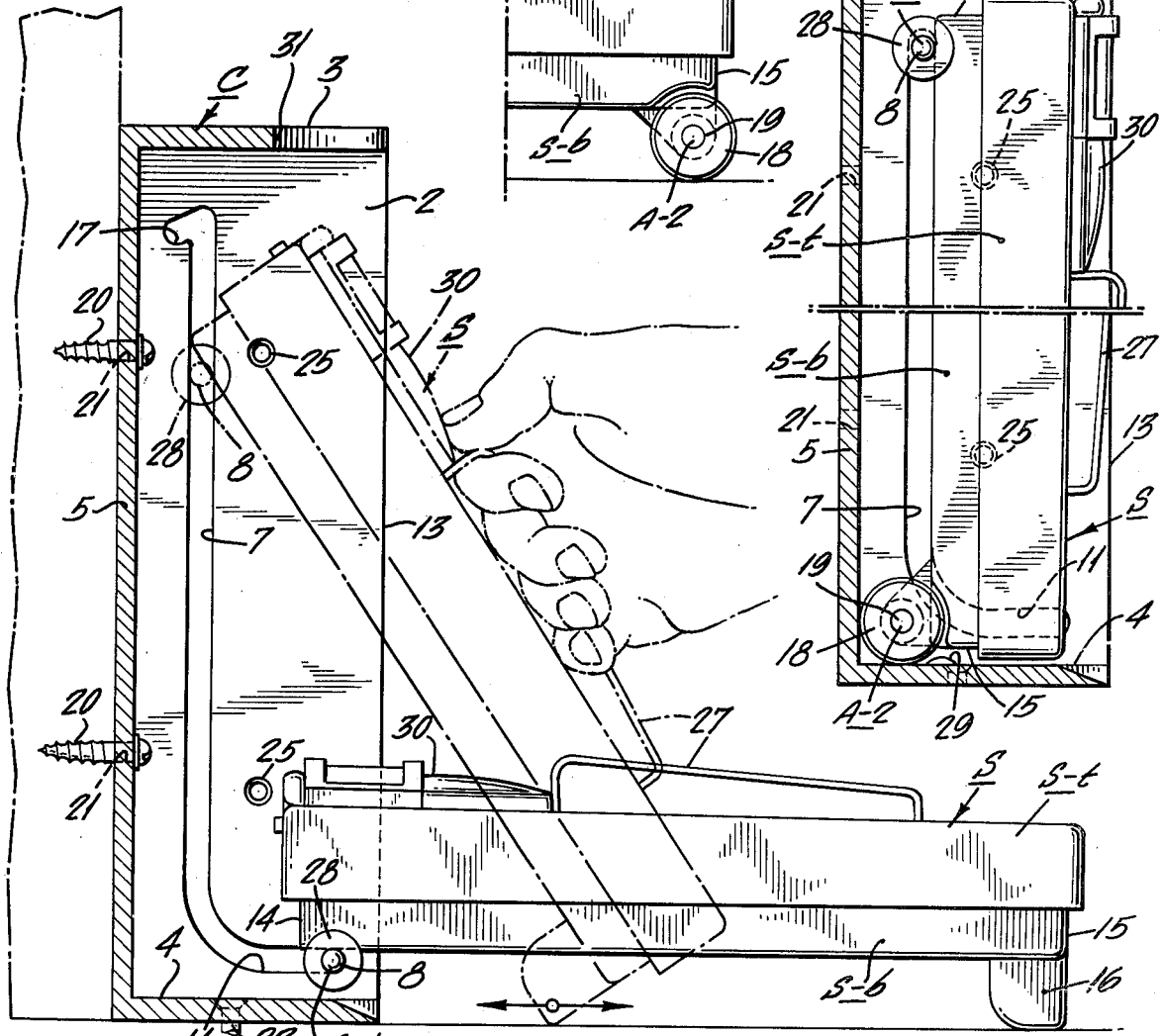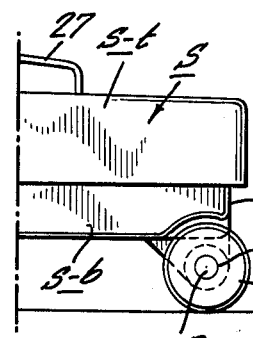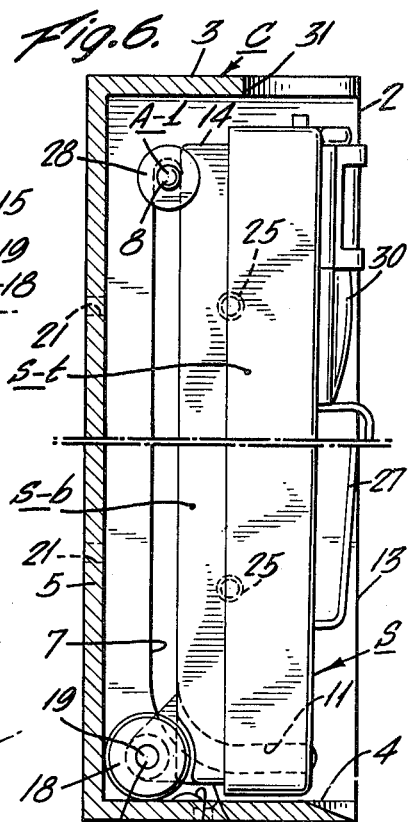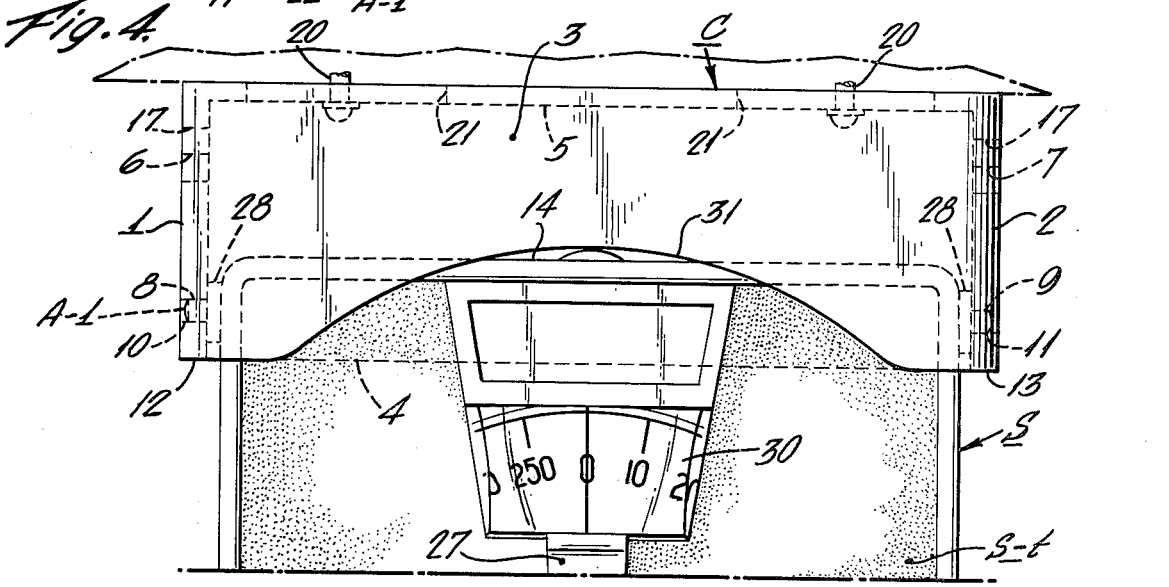

CABINET-MOUNTED BATHROOM-SCALE

BRIEF SUMMARY OF THE INVENTION

The object of the present invention is a simple, inexpensive, reliable and effective retractable cabinet-mounted bathroom-scale mounted to a wall or recessed into a wall between a pair of studs thereof, and includes a vertical box-like housing or cabinet open at its front, and having the width, height and depth thereof just sufficient to encase the bathroom scale when fully retracted, with adequate working-clearances. Pivot-guiding recesses are formed in the two side-walls facing each other, said pivot-guiding recesses having vertical portions near the back of the housing and extending generally from the bottom to the top of the housing and having lower terminal portions extending outwardly therefrom to a point near the front of the housing. The bathroom-scale has an axle secured to its rear end, near or at the bottom thereof, with its ends projecting outwardly from the sides of the bathroom-scale and into said pivot-guiding recesses.

A glider or a pair of gliders are mounted to the bottom of the bottom-member S-b of the bathroom-scale at the front end thereof for supporting the front end of the bathroom-scale when it is in its fully extended operative position. Alternatively, another axle may be secured to the front end of the bottom-member S-b of the bathroom-scale near the bottom thereof, with rollers on its opposite ends for supporting the front end of the bathroom scale when it is in its fully extended operative position. When the bathroom-scale is in its outwardly-extended operative horizontal position, with its rear end supported on its rear axle whose projecting ends are in the front ends of the lower outwardly extending terminal portions of the pivot-guiding recesses, the front end thereof is supported by the aforementioned gliders or rollers resting on the floor. When retracting the bathroom-scale, its rear axle first moves rearwardly in the lower terminal portions of the pivot-guiding recesses and then moves upwardly through the vertical portions thereof while the front end of the bathroom-scale moves closer to the housing. When the ends of the rear axle reach the top of the pivot-guiding recesses, the front end of the bathroom-scale is fully retracted into the housing, and its front gliders or rollers thereof can come to rest on the bottom of the housing.

The following U.S. Pat. Nos. are believed to show the state of the art.

Baldwin 1,887,986, 11-15-32, SCALE, Greenleaf 2,181,272, 11-28-39 WEIGHING SCALE, Holland 2,872,178, 2-3-59 CABINET WEIGHING SCALE, Townsend 2,924,443, 2-9-60 AUTOMATIC PIVOTAL WEIGHING SCALE, Johnson 3,097,712, 7-16-63 WEIGHING SCALE.

BRIEF DESCRIPTION OF THE DRAWINGS

FIG. 1 represents a front elevational view of a cabinet-mounted bathroom-scale of the present invention, with the bathroom-scale shown in its fully retracted inoperative position, as when not in use.

FIG. 2 represents a vertical cross-sectional view of the cabinet-mounted bathroom-scale of the present invention on line 2—2 of FIG. 1.

FIG. 3 represents a vertical cross-sectional view of the cabinet-mounted bathroom-scale of the present invention on line 2—2 of FIG. 1, with the bathroom-scale shown in its fully extended operative position, and also showing the bathroom-scale, in dot-and-dash lines, in a position intermediate its fully retracted position shown in FIG. 2 and its fully extended position shown in solid lines in FIG. 3, such dot-and-dash lines showing an intermediate position of the bathroom-scale, as it is being moved from its fully retracted position to its fully extended position, or vice versa.

FIG. 4 represents a fragmentary top plan view of the cabinet-mounted bathroom-scale of the present invention, to show the receeding front-edge of the top 3 of the cabinet C.

FIG. 5 represents a fragmentary side-elevational view of the front-end of the bathroom-scale in its fully extended position, showing an alternative roller support at the front-end thereof.

FIG. 6 represents a fragmentary vertical cross-sectional view, on line 2—2 of FIG. 1, of the lower end of the cabinet C, and the alternative rollers pivotally mounted to the front end of the bathroom-scale and supporting the scale by raising its front end off the bottom of the cabinet and showing alternative upper end of the cabinet without the upper ends of the channels turned for hangingly supporting the scale from the pivots 8 & 9 as shown in FIG. 2.

DETAILED DESCRIPTION OF THE INVENTION

In the following detailed description of the invention, the bathroom-scale is designated, in its entirety, by the letter S, and its cabinet is designated, in its entirety, by the letter C. The base or bottom-member of the bathroom-scale S is designated by S-b, and the spring-supported top member thereof is designated by S-t.

The cabinet or housing includes two opposite vertical side-walls 1 and 2, a top 3, a bottom 4 and a back 5.

Vertical or generally upright pivot-guiding recesses or channels 6 and 7 are provided in the inner faces of the side-walls 1 and 2, respectively. These pivot-guiding channels or grooves may extend fully through the side-walls or may be recessed into the side-walls through the inner surfaces thereof, without extending fully through the side-walls, but to a sufficient depth adequately to guide the projecting axle-ends 8 and 9 of the axle A-1 carried by the rear end 14 of the base S-b of the scale S, or correspondingly projecting coaxial pivots separately carried by the rear end thereof. The lower terminal portions 10 and 11 of the pivot-guiding recesses or channels 6 and 7 extend outwardly and terminate short of the outer vertical edges 12 and 13 of the side walls 1 and 2, as indicated in FIGS. 2, 3, 4 and 6.

To the front end 15 of the bottom-member S-b of the bathroom-scale S a pair of gliders 16 are secured, formed of nylon or other suitable form-retaining and friction-minimizing material, for supporting the front end of the scale S when it is in its fully extended operative position shown in FIG. 3. Instead of the non-rotating gliders 16, corresponding rotating gliders or rollers 18 may be revolvably mounted on opposite ends 19 of an axle A-2. In place of axle A-2, a pair of corresponding separate coaxial roller-mounting pivots may be secured to the front end of the bottom-member S-b of the scale S.

The height of the gliders 16 and the diameters of the alternative rollers 18 and the axis of the rollers in relation to the front end of the bottom-member S-b of the bathroom-scale and the rear axle A-1 and the height of the outwardly extending lower terminal portions 10 and 11 of the channels 6 and 7 are such that when the bathroom-scale is in its fully extended operative position, shown in FIGS. 3 and 5, the bathroom-scale will be horizontal and also as close to the floor as desired, and also so that when the bathroom-scale is in its retracted inoperative position indicated in FIGS. 1, 2 & 6, the front end 15 of the bathroom-scale S will be as close to the bottom 4 of the cabinet as practicable;—either supported directly by contact between the aforementioned gliders or rollers thereof and the bottom 4 of the cabinet C or by hanging from the axle-ends (or pivots) 8 and 9 in the downwardly inclined turned channel-ends 17 extending from the upper tops of the channels 6 and 7.

The cabinet C can be mounted to the wall by screws 20 extending through the slots 21 in the back 5 of the cabinet C and extending into the wall.

Alternatively, the cabinet-mounted retractable bathroom-scale of the present invention may also be mounted against a wall by screws 22 extending through similar slots 23 in the bottom 4 of the cabinet and extending into the floor. The cabinet-mounted retractable bathroom-scale of the present invention can also be recessed into the wall between adjacent studs thereof, by screws 24 extending through holes 25 in the side-walls 1 and 2 thereof, and screwed directly into the adjacent studs or into fillerblocks or furring means secured to the two wall-studs nearest to the sides 1 and 2 of the cabinet.

Spacer washers 28 on the ends 10 and 11 of axle A-1 may be interposed between the rear end of the bottom-member S-b of the scale S so as to space the sides of the scale S from and centrally between the side-walls 1 and 2 of the cabinet C.

Especially when using rollers 18 a slight bead 29 may be applied to the bottom 4 of the cabinet C in front of the rollers 18, in lieu of the down-turned extensions 17 of the upper ends of the channels 6 and 7, as indicated in FIG. 6, to keep the front end of the bathroom scale S from unintendedly rolling out of the cabinet.

If it is desired to use the gliders 16 without the down-turned extensions 17 of the upper ends of the channels 6 and 7, the gliders 16 can be extended forwardly so that the frontmost portions thereof will be slightly forward of the front of the top-member S-t of the scale S, so that when the scale S is fully retracted into its inoperative position shown in FIG. 2, gliders 16 will contact and bear against the inner surface of the bottom 4 of the cabinet, with the top-member S-t of the scale S raised slightly off the bottom 4 of the cabinet, and so that the frictional engagement between the gliders 16 and the bottom 4 of the cabinet will prevent the front end of the scale S from unintendedly coming out of the cabinet C.

The bathroom-scale S can be moved out of the cabinet and can again be moved into the cabinet, as indicated by the dot-and-dash lines in FIG. 3, by means of a handle 27 affixed to the top-member S-t of the bathroom-scale.

For greater visibility of the dial 30 of the bathroom-scale S, the front edge of the top 3 of the cabinet C may be recessed inwardly along the line 31 indicated in FIGS. 1, 2, 3, 4 & 6.

I may interpose a helical tension spring or a pair of such springs (not shown) between the top 3 of the cabinet C or the sides 1 & 2 thereof and the front axle or axis A-2 or between the top 3 of the cabinet and a spring-anchorage or a pair of spring-anchorages (not shown) affixed to or extending from the side-walls of the bottom member S-b of the bathroom-scale S, so that when the bathroom-scale is moved inwardly from its fully extended position until the axle or axis A-1 thereof is in the lower ends of the vertical portions of the channels 6 and 7, the springs will fully retract the bathroom-scale into its inoperative position shown in FIGS. 2 and 6.

Having shown and described an embodiment of my invention, I claim the following:

1. A cabinet-mounted bathroom-scale comprising
   a bathroom scale;
   a cabinet having a top wall and two generally vertical side-walls having generally vertically disposed pivot-guiding grooves therein;
   opposite pivots carried by the rear end of the bathroom-scale and extending into said grooves;
   said grooves and said pivots being so arranged that when the rear end of the bathroom-scale is raised the pivots thereof will rise upwardly in the grooves and the front end of the bathroom-scale can be moved into the cabinet, and so that by lowering the pivots in said grooves the front end of the bathroom-scale will extend outwardly from the cabinet into its operative position; and
   said top of the cabinet having a cutout in the front edge thereof for improving visibility of the bathroom-scale.

2. A cabinet-mounted bathroom-scale according to claim 1, in which the face of the bathroom-scale faces outwardly when it is retracted into the cabinet.

3. A cabinet-mounted bathroom-scale according to claim 1, in which the pivot-guiding grooves have their lower terminal portions extending outwardly so that the rear end of the bathroom-scale will be moved outwardly when it is moved into its fully extended operative position.

4. A cabinet-mounted bathroom-scale comprising
   a bathroom scale;
   a cabinet having a bottom wall and two generally vertical side-walls which have generally vertically disposed pivot-guiding grooves therein;
   opposite pivots carried by the rear end of the bathroom-scale and extending into said grooves;
   said grooves and said pivots being so arranged that when the rear end of the bathroom scale is raised the pivots thereof will rise upwardly in the grooves and the front end of the bathroom-scale can be moved into the cabinet, and so that by lowering the pivots in said grooves the front end of the bathroom-scale will extend outwardly from the cabinet into its operative position;
   glider means at the front end of the bathroom-scale for gliding on the floor, and so that when the bathroom scale is extended outwardly into its operative position, the front end thereof will be supported by the glider means resting on the floor, and when the front end of the bathroom-scale is in the cabinet, the glider means rests on the bottom wall of the cabinet, and
   said bottom wall of the cabinet including bead means positioned so that the bead means extends in front of the glider means when the front end of the bathroom-scale is in the cabinet to inhibit the front end from gliding out of the cabinet.

5. A cabinet-mounted bathroom-scale according to claim 4, in which the glider means are rolling means.

6. A cabinet-mounted bathroom-scale comprising
   a bathroom-scale;

a cabinet having two generally vertical side-walls which have generally vertically disposed pivot-guiding grooves therein;

opposite pivots carried by the rear end of the bathroom-scale and extending into said grooves;

said grooves and pivots being so arranged that when the rear end of the bathroom-scale is raised the pivots thereof will rise upwardly in the grooves and the front end of the bathroom-scale can be moved into the cabinet, and so that by lowering the pivots in said grooves the front end of the bathroom-scale will extend outwardly from the cabinet into its operative position;

said pivot-guiding grooves having lateral extensions which extend from the upper ends of the grooves in a downwardly inclined direction and in which the pivots can be entered by raising the bathroom-scale into its vertical position and moving the rear end thereof laterally to cause the pivots to be disposed in said lateral extensions; and said lateral extensions being so arranged that when the pivots are disposed therein the bathroom-scale hangs from its pivots in a generally upright position.

* * * * *